Feb. 9, 1926.
J. A. FRAMPTON
1,572,525
WRENCH
Filed March 25, 1925
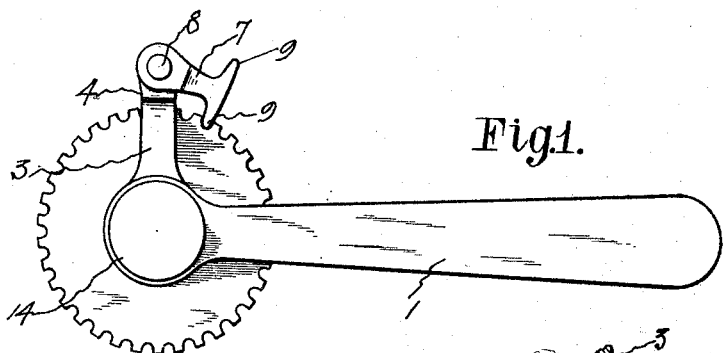
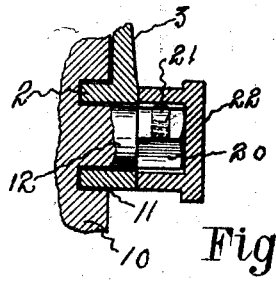
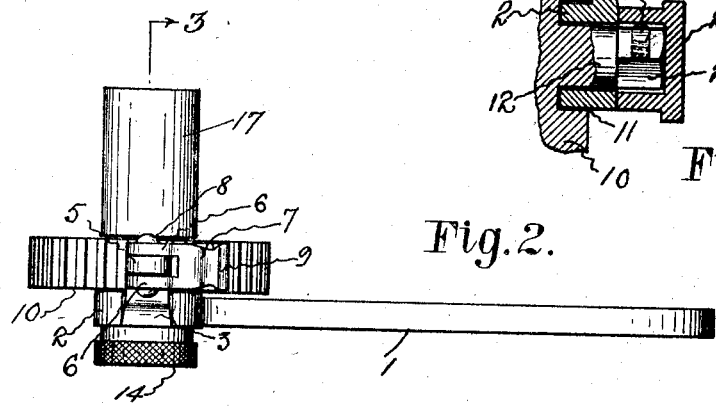
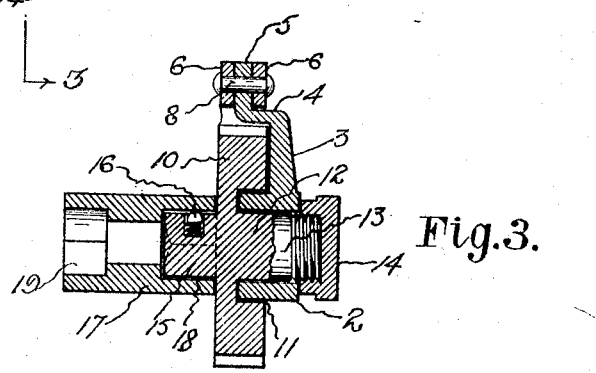
Inventor
John A. Frampton
Attorney Patented Feb. 9, 1926.

1,572,525

UNITED STATES PATENT OFFICE.

JOHN A. FRAMPTON, OF COLUMBUS, OHIO, ASSIGNOR OF ONE-HALF TO NIHL L. PARKER, OF COLUMBUS, OHIO.

WRENCH.

Application filed March 25, 1925. Serial No. 18,268.

*To all whom it may concern:*

Be it known that I, JOHN A. FRAMPTON, a citizen of the United States, residing at Columbus, in the county of Franklin and State of Ohio, have invented certain new and useful Improvements in Wrenches, of which the following is a specification.

The present invention is directed to improvements in wrenches more particularly designed for applying or removing nuts from automobile wheel rims, but is not necessarily limited to such use.

The primary object of the invention is to provide a device of this character constructed in such manner that it can be easily operated and with little effort on the part of the operator.

A further object of the invention is to provide a device of this kind which is extremely simple in construction, durable, efficient in operation and one which can be manufactured at a very small cost.

With these and other objects in view, this invention resides in the novel features of construction, formation, combination, and arrangement of parts to be hereinafter more fully described, claimed, and illustrated in the accompanying drawing, in which:—

Figure 1 is a top plan view.

Figure 2 is a side elevation.

Figure 3 is a sectional view on line 3—3 of Figure 2.

Figure 4 is a detail sectional view of a slightly modified form of the invention.

Referring to the drawing, 1 designates the handle provided upon one end with a laterally extending bearing sleeve 2, said sleeve being provided with an integrally connected post 3 disposed at right angles to the longitudinal axis of the handle. This post is provided with a shoulder 4 which terminates in an upwardly extending plate 5 which is engaged between the furcations 6 of the reversible pawl 7 by a pin 8. This pawl has its free end provided with oppositely directed teeth 9.

A ratchet wheel 10 is employed and has formed in one face thereof an annular groove 11 and resultant hub 12 which is rotatably and snugly engaged in the bearing sleeve 2, and while the hub is freely rotatable the construction is such as to positively prevent wabbling of said wheel.

The hub 12 has formed integral therewith a threaded extension 13 upon which is engaged the finger nut 14, which not only constitutes means for manually rotating the wheel, but also prevents accidental disengagement of the hub from the bearing sleeve.

The reverse side of the hub 12 is provided with an integral shank 15, preferably hexagonal in cross section and has carried thereby a spring pressed ball 16, the purpose of which will appear later.

A nut engaging member is provided and has formed in its respective ends sockets 18 and 19, the former being adapted to receive the shank 15 and is held thereon by the ball 16. By employing the ball the socket members varying in size may be interchangeably connected with the device for operation in connection with nuts of various sizes. It will be of course understood that the socket 19 is employed for engaging a nut.

Owing to the fact that the shoulder 4 overhangs toothed periphery of the wheel 10 the pawl 7 will be properly positioned for effective operation.

When it is desired to apply a nut to a bolt the nut may be placed in the socket 19 and engaged with the bolt, after which the nut 14 is rotated until the nut is firmly engaged upon the bolt. The pawl having been swung to the desired position and the selected tooth 9 engaged with the wheel, the handle 1 is oscillated in order to turn the wheel until the nut is tightly screwed upon the bolt, and to remove a nut the position of the pawl is reversed and the handle actuated until the nut is comparatively loose after which the wheel is rotated by the nut 14 until the nut is free from the bolt. Thus it will be observed that a nut may be started upon a bolt merely upon rotating the wheel 10 through the medium of the nut 14 or removed after being loosed without the necessity of actuating the handle 1.

Since the post 3 is arranged in angular relation with respect to the handle 1 considerable leverage is obtained with a comparatively short handle.

While I have described my invention as particularly adapted for use in connection with automobile wheels it will be of course understood that it can be used with equal success in connection with other devices.

From the foregoing it is thought that the construction, operation and many advantages of the herein described invention will be apparent to those skilled in the art, and it will be understood that various changes in size, shape, and proportions may be resorted to without departing from the spirit of the invention.

In the modified form of the invention as shown in Figure 4, the hub 12 terminates in a hexagonal shank 20 having a spring pressed ball 21 carried thereby which serves to hold the nut 22 in place. It will be obvious that the nut 22 can be removed and the member 17 engaged with the shank, thereby permitting said member to be used upon either side of the hub.

I claim:

A wrench comprising a handle having a laterally extending bearing sleeve upon one end, a ratchet wheel having an annular groove formed in one side thereof and a resultant hub for rotatable engagement within the bearing sleeve, an extension on the hub, a nut engageable with the extension and with the sleeve for holding the sleeve within the groove, a post rising from the bearing sleeve and having a lateral shoulder adapted to overhang the periphery of the ratchet wheel and bearing sleeve, and a pawl pivotally connected with the post for engagement with the ratchet wheel.

In testimony whereof I affix my signature.

JOHN A. FRAMPTON.